US011869016B1

(12) United States Patent
Hardage et al.

(10) Patent No.: US 11,869,016 B1
(45) Date of Patent: Jan. 9, 2024

(54) MULTI-CHANNEL TOPIC ORCHESTRATOR

(71) Applicant: UIPCO, LLC, San Antonio, TX (US)

(72) Inventors: David Charles Hardage, San Antonio, TX (US); Samantha Sprague, Glendale, AZ (US); William Leland Fehlman, Williamsburg, VA (US); Shane Michael Steinert, San Antonio, CA (US); Rajila Vinod, Boerne, TX (US); George Pinkosky, Round Rock, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1123 days.

(21) Appl. No.: 16/417,449

(22) Filed: May 20, 2019

(51) Int. Cl.
  *G06F 18/2115* (2023.01)
  *G06Q 30/016* (2023.01)
  *G06F 16/9035* (2019.01)
  *H04M 3/53* (2006.01)
  *G06F 16/908* (2019.01)
  *G06F 40/30* (2020.01)
  *G06N 20/00* (2019.01)

(52) U.S. Cl.
  CPC ......... *G06Q 30/016* (2013.01); *G06F 16/908* (2019.01); *G06F 16/9035* (2019.01); *G06F 18/2115* (2023.01); *G06F 40/30* (2020.01); *H04M 3/5307* (2013.01); *G06N 20/00* (2019.01)

(58) Field of Classification Search
  CPC . G06Q 30/016; G06F 16/9035; G06F 16/908; G06F 40/30; G06F 40/20; G06F 16/35; H04M 3/5307; H04M 3/51
  See application file for complete search history.

(56) References Cited

U.S. PATENT DOCUMENTS

| | | | | |
|---|---|---|---|---|
| 2010/0257117 A1* | 10/2010 | Shvadron | ............... | G06F 16/313 |
| | | | | 705/36 R |
| 2011/0060983 A1* | 3/2011 | Cai | ...................... | G06F 16/9562 |
| | | | | 715/254 |
| 2011/0137906 A1* | 6/2011 | Cai | .......................... | G06F 40/30 |
| | | | | 707/750 |
| 2014/0258198 A1* | 9/2014 | Spivack | .................. | G06Q 50/01 |
| | | | | 706/21 |
| 2015/0071418 A1* | 3/2015 | Shaffer | ............... | H04M 3/5166 |
| | | | | 379/88.01 |

* cited by examiner

*Primary Examiner* — Sanchita Roy
(74) *Attorney, Agent, or Firm* — Perkins Coie LLP

(57) ABSTRACT

People provide content such as a recorded text or audio on various platforms, such as recorded telephone lines, social media, or web chats. The techniques described in this patent document can be used to obtain a set of topics that characterize the words in the recorded text or audio for each platform. By identifying topics being discussed on several platforms and by correlating topics between the platforms, a multi-channel topic orchestration server can generate a timeline that shows when the topic appeared on the various platforms.

20 Claims, 5 Drawing Sheets

MULTI-CHANNEL TOPIC ORCHESTRATOR

TECHNICAL FIELD

This disclosure is directed generally to systems, methods, and apparatus for machine learning based topic correlation.

BACKGROUND

Some companies or organizations interact with customers or people whose lives are affected or will be affected by an event. For example, customers who experience a weather-related event such as a hurricane may call their banks to inquire about their banks' policy to defer a payment by a month without incurring a penalty. In another example, if a company manufactured a product that is later found to be defective, that company will receive a number of inquiries from their customers regarding what the company plans to do about the defective product. In many instances, companies or organizations may have customer service representatives that are not prepared or properly trained to handle or anticipate the questions from customers whose lives are impacted by an event and yet the customers still need answers. Thus, companies or organizations may not have the tools needed to prepare for events that may affect their day-to-day operations.

Figure 1:
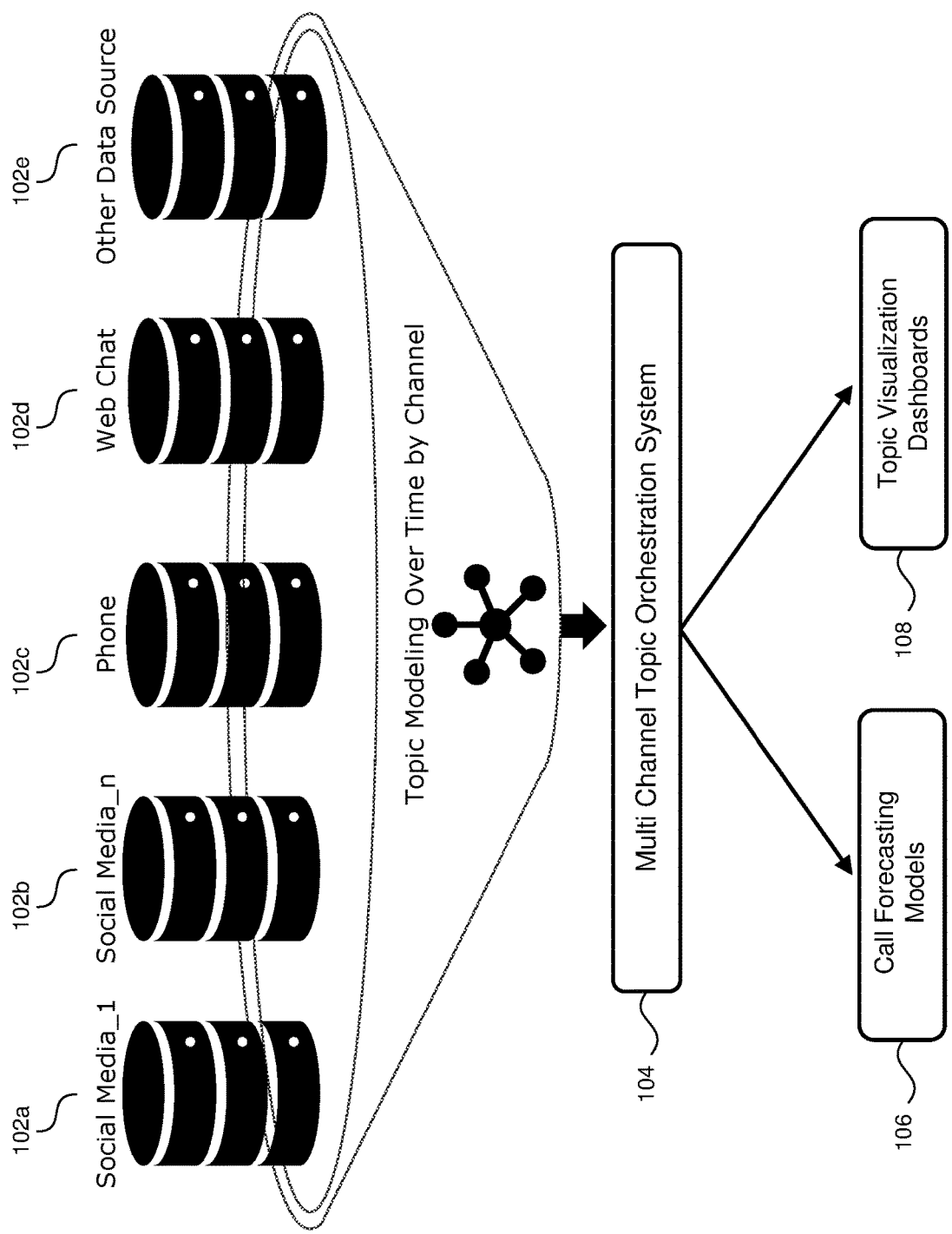
FIG. 1 shows an example block diagram of a system to identify and correlate topics from data received from multiple data sources.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

This patent document describes techniques to identify topics discussed by various persons on several platforms. Some examples of platforms that allow people to express their opinions or concerns may include social media platforms, or recorded telephone calls or web chats where people can communicate with representatives of a company or organization. By identifying topics being discussed on several platforms and by correlating topics between the platforms, a company or organization can anticipate and/or better prepare for their customers' needs. In an example embodiment, machine learning techniques can be used to identify topics from data sources provided by the platforms. Based on the identified topics for each data source, one or more topics from one data source can be correlated with one or more topics from another data source. Furthermore, the topic identification and the topic correlation features can be performed periodically to create a timeline that can show that a topic appearing on one platform at one time correlates to topic appearing on another platform at a later time.

A company or organization can realize several benefits to help them manage its customers' expectations and concerns by determining the number of topics from each data source and by correlating the topics between the data source. For instance, a company that periodically determines the number of topics can determine that certain topics being discussed on a platform are or become over time more popular over other topics on that platform. In another example, a company that periodically correlates topics can predict when its customers may contact (e.g., call its phone platform, interact via chat) the organization about a topic being discussed on a social media platform.

FIG. 1 shows an example block diagram of a system to identify and correlate topics from data received from multiple data sources. The top of FIG. 1 shows that each of a plurality of data sources 102a-102e can send a set of data to a multi-channel topic orchestration system 104. The plurality of data sources can include one or more social media data sources 102a-102b, a phone transcript data source 102c, a web chat transcript data source 102d, and/or some other data source 102e such as Internet of Things (IoT) device data source. A data source can be referred to as a channel, and a data source may be a server that provides a type of information associated with a channel. For example, a data source for Social Media_n channel may include a server controlled by or affiliated with a social media company, where the server provides a set of data to a multi-channel topic orchestration system 104.

The set of data can include content (e.g., text or audio) provided by people and recorded by the data source. For example, a user on a social media channel can post or upload a message to a social media server, where the text associated with that message can be sent by the social media data source to the multi-channel orchestration system. In another example, a person who calls a customer service phone number may consent to having his or her phone call recorded by a phone transcript server. In some cases, the phone transcript server may employ signal processing techniques to convert the audio of the recorded phone call to a transcribed text.

A data source may periodically send sets of data that can relate to or that can be limited to certain time periods (e.g., daily, weekly, or monthly). By associating a set of data with a time period, the multi-channel topic orchestration system 104 can determine topics from the set of data and can relate those topics to a time value within the time period. For example, each data source can provide a set of data to a multi-channel topic orchestration system 104 on a weekly schedule, so that the set of data provided at the end of a week may correspond to content provided by people for that week. Furthermore, a set of data sent at one time instant (e.g., on Saturday of a week) may be different than a set of data sent on another time instant (e.g., Saturday of the next week). Using the techniques described in this patent document (e.g., topic modeling), the multi-channel topic orchestration system 104 can (among other things) (1) receive a set of topics from a data source, (2) determine a set of topics for the set of data, and (3) determine a time value that describes when the set of topics were discussed by people in the set of data.

Based on the topics identified by the multi-channel topic orchestration system 104, the topics may be further analyzed as part of a call forecasting model 106. A call forecasting model 106 can correlate topics between the channels within a same time period and/or across the different time periods so that a company or organization can determine how a topic that appears on one channel is related to another channel. For example, if the multi-channel topic orchestration system 104 receives daily sets of data from a social media data source and a phone transcript data source, and if the multi-channel topic orchestration system 104 determines that Topic A appeared in a social media-related set of data on Monday of a week and that the same Topic A appeared in a phone transcript-related set of data on Wednesday of that same week, then the multi-channel topic orchestration system 104 can determine that if Topic A appears on a social media channel, it may appear two days later on a phone channel. In some embodiments, the data can be generalized such that if a topic has not been analyzed before by the system, the system can assume that a topic appearing on one channel will appear on a second channel within a certain period of time based on historical data (e.g., average time for a topic on channel 1 to appear on channel 2 is two days).

Based on the topics identified by the multi-channel topic orchestration system 104, the topics may be displayed on topic visualization dashboards 108. The multi-channel topic orchestration system 104 can determine a number of topics from a set of data. Thus, in some embodiments, a topic visualization dashboard can display to one or more persons within a company or organization the identified topics for a set of data.

The multi-channel topic orchestration system 104 can also determine whether one topic is more popular or is discussed more than another topic within the same set of data. Furthermore, as mentioned above, the multi-channel topic orchestration system 104 can determine a time value when the topics appeared in the set of data. Thus, in some embodiments, the multi-channel topic orchestration system 104 can generate a timeline that shows the topics associated with various time values and the relative importance or popularity of the topics identified for each time value. By using this timeline, a person can determine whether a topic associated with one channel at a time value gained popularity on that same channel at a later time value. Techniques for performing the call forecasting model 106 and topic visualization dashboards 108 are further described in this patent document.

Once a timeline has been established, when a topic appears on one channel that may affect a customer base, a protocol can be generated. For example, if a topic appearing on a social media channel is expected to appear on a chat or phone channel within 24 hours, training can be issued to representatives with answers to expected questions, policies of the company relating to the topic, and/or general information about the topic. In some embodiments, representatives are given information that the topic may be affecting the customer calling in (e.g., note appears on screen) so the representative can be aware of the situation and react accordingly (e.g., the company will not charge late fees on bills if the customer is not getting paid for a few weeks due to a government shut-down, the customer should not be offered new products if the customer is affected by the government shut-down). In some embodiments, the website may be updated to address questions the customer may have regarding the topic. Thus, using the correlation, a proactive, individualized approach may be taken to more efficiently serve customers.

The embodiments described in this patent document describe methods, apparatus and systems for identifying and correlating topics to predict when a topic appearing on one channel may affect another channel. For example, in Section I below, this patent document describes techniques to identify topics from data received from a plurality of data sources. In Section II, this patent document describes techniques to correlate topics between the data sources. In Section III, this patent document describes techniques to generate a call forecasting model, topic visualization dashboards, and to perform additional operations based on the identified and correlated topics described in Sections I and II. The example headings for the various sections below are used to facilitate the understanding of the disclosed subject matter and do not limit the scope of the claimed subject matter in any way. Accordingly, one or more features of one example section can be combined with one or more features of another example section.

I. Identifying Topics from Data Received from a Data Source

Figure 2:
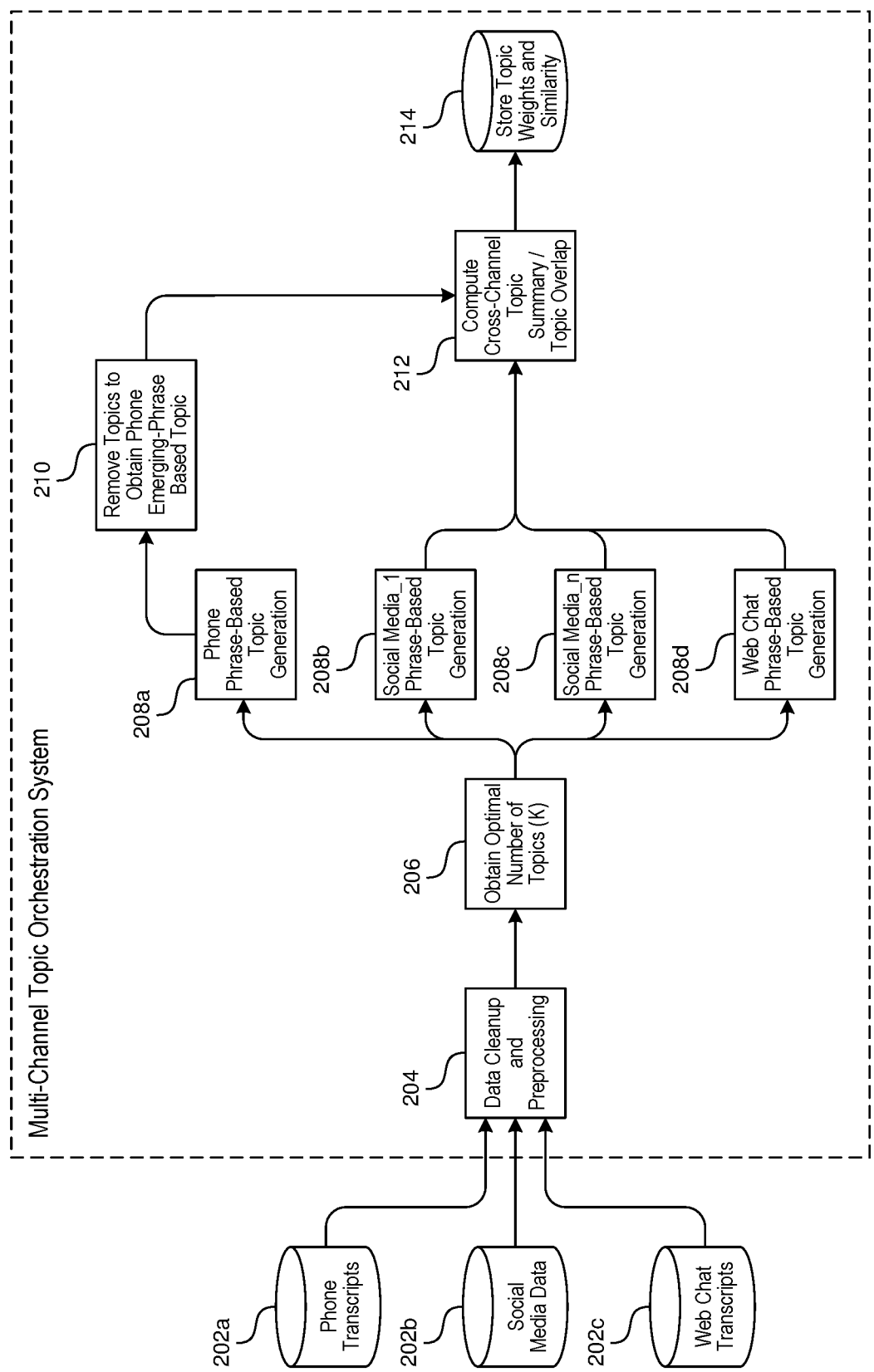
FIG. 2 shows an example flowchart of data analysis performed by a multi-channel topic orchestration system.

FIG. 2 shows an example flowchart of data analysis performed by a multi-channel topic orchestration system described in FIG. 1. The multi-channel orchestration system may include one or more servers. Thus, the operations described for the multi-channel orchestration system may be performed by a single server or it may be performed by multiple servers.

FIG. 2 shows a plurality of data sources 202a, 202b, 202c that each send a first set of data to a multi-channel orchestration server. The first set of data from each data source includes recorded words (e.g., text or audio) from people. Section I of this patent document describes data analysis performed on a first set of data for one data source to simplify the described technology. Thus, the techniques described in Section I of this patent document can be applied to each set of data received from the plurality of data sources.

At the data cleanup and pre-processing operation 204, a multi-channel topic orchestration server can perform a soft word removal process. For example, a multi-channel topic orchestration server can generate a second set of data by removing from the first set of data misspelled words and/or words from a pre-defined list of words that are not important (e.g., "a", "and," "of", "to," and/or "the"). Be performing the data cleaning and pre-processing operation 204, a multi-channel topic orchestration server can obtain a second set of data may summarize the overall vocabulary in the first set of data into words and/or phrases that can communicate an idea or a topic.

At the obtain or determine optimal number of topics (K) operation 206, a multi-channel topic orchestration server can obtain a pre-determined number K that describes a total number of topics that the multi-channel topic orchestration server is to determine from a set of data. The value for K may be an integer greater than zero. In some embodiments, a value for K can be the same for all of the data sources so that a uniform number of topics can be determined by a multi-channel topic orchestration server for each data source. In some other embodiments, a value for K may be different between the various data sources. For example, a value for K for phone transcript data source 202a may be 5 and a value for K for web chat transcript data source 202c may be 7. In some embodiments, a value for K may be between five and ten, inclusive, so that an ideal number of topics may be determined at topic generation operations 208a-208d. Thus, the number of topics (K) is used by the multi-channel topic orchestration sever to build topic models as described in topic generation operations 208a-208d.

At topic generation operations 208a-208d, a multi-channel topic orchestration server can determine a set of topics using the second set of data (i.e., cleaned up and pre-processed data) for each data source. The set of topics relate to words included in the second set of data and may include phrase-based topics. The multi-channel topic orchestration server may determine a set of topics by performing an unsupervised machine learning that can include a topic modeling technique. An example of topic modeling technique includes Latent Dirichlet Allocation (LDA). The total number of topics in the set of topics is based on a value of K for each data source as described in operation 206. As mentioned above, the value for K may be an integer greater than zero. Thus, for each data source 202a, 202b, and/or 202c, a multi-channel topic orchestration server may obtain at least one topic.

A multi-channel topic orchestration server can also determine whether a topic determined from a second set of data is discussed more frequently than another topic from the same second set of data. For example, a multi-channel topic orchestration server may weigh words from the second set of data related to a particular topic based on a frequency at which they appear in the second set of data. By weighting words in the second set of data, a multi-channel topic orchestration server can determine the relative importance of words, and therefore the topics to those words, within the second set of data for each data source. Thus, in some embodiments, a set of topics are determined at the topic generation operations 208a-208d based at least in part on a set of values that describe a frequency of usage of each word in the second set of data.

The set of topics obtained from a phone transcript data source 202 undergoes additional data processing and analysis to enable a company or organization to better identify emerging topics as opposed to topics that are constantly being discussed on its web chat or phone channel. One of the benefits of the multi-channel topic orchestration system is that it can assist companies or organizations to identify emerging topics appearing on one channel to predict or identify whether those topics appear on another channel. For example, if a topic of an impending hurricane is being discussed on social media channel, a bank's customers may call the bank to inquire about deferring credit card payment due to the hurricane. While the bank can use the techniques described in this patent document to determine if the topic of hurricane will appear on its phone channel, such a topic may most likely be drowned out by other topics such as insurance or credit card fraud or account status that are more relevant to the bank's day-to-day operation. For example, if a value of K is three for a phone transcript data source, and if the top three topics identified are insurance, credit card fraud, and account status, then the topic of hurricane or weather will not be identified. To overcome at least this issue, the remove topics operation 210 can be performed.

At the remove topics operation 210, a multi-channel topic orchestration server can remove from the set of topics determined at the phone phrase-based topic generation operation 208a the topics that appear in a pre-defined list. Continuing with the example described above, the pre-defined list may include topics such as insurance, credit card fraud, and account status so that other emerging or secondary topics may be identified by the multi-channel topic orchestration server for the set of data obtained from the phone transcript data source 202a. Thus, by removing some of the primary topics and phrases that may appear in the phone phrase-based topic generation operation 208a, the remove topics operation 210 can yield a set of topics that can include emerging or secondary topics that may be of importance for some cases.

II. Correlating Topics Between Multiple Data Sources

In Section I, this patent document describes techniques to identify topics from data received from a plurality of data sources. In Section II, this patent document describes techniques to correlate topics between the data sources.

In FIG. 2, at the computing operation 212, a multi-channel topic orchestration server can determine at least one similarity value that describes a similarity between at least one topic from a set of topics for a data source and at least one topic from another set of topics for another data source. In some embodiments, a multi-channel topic orchestration server can determine that two topics between two channels are similar if one topic determined from one set of data associated with one data source is the same as a topic determined from another set of data associated with another data source. In such embodiments, a similarity value may be 1 to indicate that two topics are the same.

At the storing operation 214, a multi-channel topic orchestration server can store the identified or determined topics, determined frequency of words or topics, and determined similarity values, as described in Sections I and II.

III. Analysis Based on Identified and Correlated Topics

As shown in FIG. 1, the multi-channel topic orchestration system can generate topic visualization dashboards 108 and call forecasting models 106 based on the identified and correlated topics. In Section III, techniques to generate topic visualization dashboard and call forecasting models are further described.

a. Topic Visualization Dashboards

A topic visualization dashboard may be a graphical user interface (GUI) that shows the topics identified for each data source as explained in FIG. 2. In some embodiments, a multi-channel topic orchestration server can generate a topic visualization dashboard so that a person associated with a company or organization can see the topics being discussed on the various channels to determine whether those topics bear relevance to the company's or organization's day-to-day operations. The generated topic visualization dashboard may include a timeline that shows when the identified topics appeared in each of the data sources.

Figure 3:
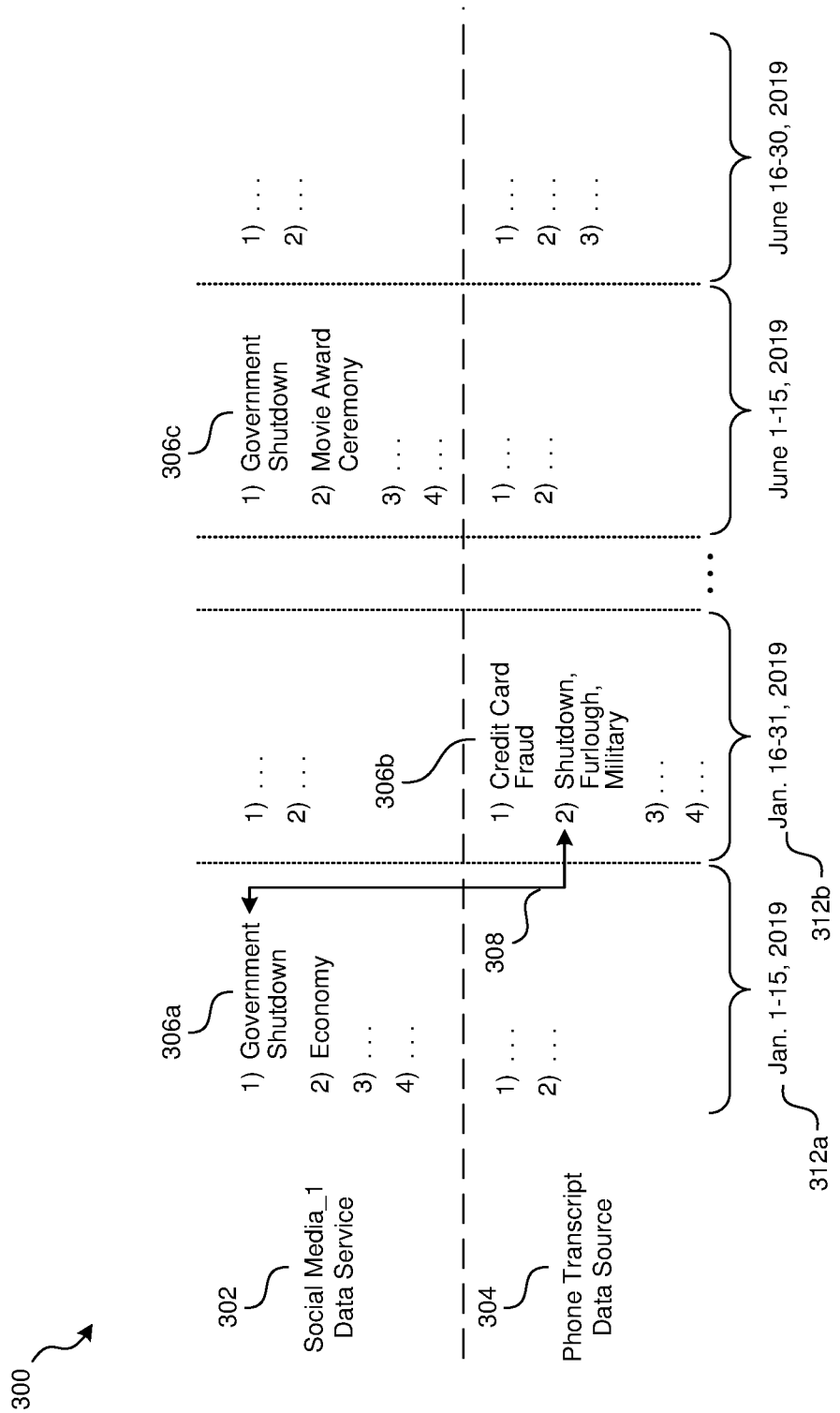
FIG. 3 shows an example timeline information generated by a multi-channel topic orchestration server.

A multi-channel topic orchestration server can determine time values for each of the topics identified for each of the data sources. By obtaining the times values when the topics appeared in the data sources, a multi-channel topic orchestration server can generate a timeline as shown in FIG. 3, where the timeline includes the topics and the corresponding time values to indicate when the topics appeared in the various data sources. To simplify the description for generating a timeline, the process described below describes the operations performed on a first topic from a first set of topics 306a from a first data source 302 and a second topic from a second set of topics 306b from a second data source 304. Thus, the operations described for generating the timeline can be applied to all of the topics identified from the various data sources. Continuing with the process described in FIG. 2, at the computing operation 212, a multi-channel topic orchestration server can determine a first time value when the first topic appears in the first data source and a second time value when the second topic appears in the second data source. The first and second time values may correspond to different time periods 312a, 312b, respectively (e.g., Jan. 1 to 15, 2019 and Jan. 16 to 31, 2019 respectively in FIG. 3), which indicates that the first and second data sources may provide a set of data for different time periods. In some embodiments, a time value may be a date and/or time associated with a time period when a data source obtains content from its users. In some embodiments, the first time value and the second time value appear during a same time period (e.g., January 1-15) but on different days or at different times.

At the computing operation 212, a multi-channel topic orchestration server can generate for the first and second data source, a timeline that includes at the first and second time value, the respective set of topics identified for each of the first and second data source, and an indication that the first topic is similar to or same as the second topic. In some embodiments, a multi-channel topic orchestration server can determine that two topics are same or similar within the same time period or within different time periods if the similarity value that compares the two topics is greater than or equal to a pre-determined threshold value. For example, if two topics have overlapping terms (e.g., "government shutdown" shown in set of topics 306 and "shutdown" shown in another set of topics 306b from different time periods), then the similarity value may be 0.5 to indicate that a part of a term is common between the two sets, where the pre-determined threshold value may be 0.4. For example, if two topics are the same (e.g., government shutdown shown in set of topics 306a and another set of topics 306c from different time periods), then the similarity value may be the "1," where the pre-determined threshold value may be 0.7.

If a multi-channel topic orchestration server determines that a similarity value of two topics is greater than a pre-determined threshold value, then the server can add an indication to the generated timeline to indicate that the two topics are considered similar or the same. As shown in FIG. 3, some examples of an indication may include a line 308 connecting two topics from the same or different time periods, an icon or asterisk next to the similar or same topics, or a same color box around the similar or same topics. In some embodiments, the timeline can include a configurable time period so that only those values that fall within the time period are shown. For example, a person can use a GUI on a computer to select a time period from Jan. 1, 2019 to Jun. 30, 2019 at which point a multi-channel topic orchestration server receives the selected time period and generates a timeline, topics and relationships between the topics based on the selected time period. FIG. 3 shows the generated timeline 312a, 312b, topics 306a, 306b, 306c, and relationships between the topics 308 that can be collectively referred to as timeline related information. Thus, the timeline related for the selected time period can be sent by a multi-channel topic orchestration server to a computer to be displayed as shown in FIG. 3.

A multi-channel topic orchestration server can send the timeline related information (as shown in FIG. 3) to display on one or more computers associated with persons within a company or organization, where the persons can use the timeline related information to better manage their company's or organization's day-to-day operations. For example, a customer service representative's computer may display the timeline related information sent by the multi-channel topic orchestration server, so that the customer service representative may be able to better understand the social, political, or economic context within which he or she is speaking with a customer.

b. Call Forecasting Model

A call forecasting model (or web chat forecasting module) can allow a company or organization to predict when a topic appearing on one channel may appear on a channel related to the company or organization. For example, the phone transcript data source 304 in FIG. 3 may provide transcripts from a customer service call center associated with a company or an organization. In some embodiments, if the first and second times values for the first and second set of topics 306a, 306b are associated with different time values 312a, 312b, then a multi-channel topic orchestration server can perform call forecasting modeling to determine whether a topic appearing on one channel (e.g., Social Media_1 channel 302) may later appear on a company's phone transcript channel 304. As mentioned above, a multi-channel topic orchestration server can obtain a list of prior topics 306a, 306b and related information. If a multi-channel topic orchestration server determines that one of these prior topics later appears on a channel (e.g., Social Media_1 data source 302), then the multi-channel topic orchestration server can predict when that topic may appear on another channel (e.g., phone transcript data source 304).

Continuing with the example timeline shown in FIG. 3, a multi-channel topic orchestration server can receive a new set of data from a data source (e.g., Social Media_1 data source 302), where the new set of data includes recorded words from people, the new set of data is received after the new set of data that yields the sets of topics 306a, 306b, and the new set of data is associated with a new time value (e.g., Jun. 1 to 15, 2019). Using the techniques described in this patent document, a multi-channel topic orchestration server performs operations 204, 206, and any one of 208a-208d as described in FIG. 2 to obtain a set of topics 306c as shown in FIG. 3.

If a multi-channel topic orchestration server determines that the set of topics 306c includes a topic (e.g., "government shutdown") that is included in a set of topics 306a from a previous time period for the same data channel, then the multi-channel topic orchestration server can determine a time value that predicts when that topic (e.g., "government shutdown") or a related topic (e.g., shutdown) may appear in the phone transcript data channel 304. The determined time value may be based on the new time value (e.g., within June 1 to 15, 2019) and a difference between the first time value (e.g., within January 1 to 15, 2019) and the second time value (e.g., within January 16 to 31, 2019). For example, if a multi-channel topic orchestration server determines that the government shutdown topic appeared on the social media channel on Jan. 5, 2010, and the topic of shutdown appeared on the phone transcript channel on Jan. 20, 2019, then if the topic of government shutdown again appears in the social media channel on Jun. 1, 2019, then the multi-channel topic orchestration server can determine that the topic of government shutdown may appear in the phone transcript channel on approximately Jun. 16, 2019.

In some implementations, generalized data can be used to predict when the company is likely to receive inquiries related to a topic. For example, if historical data shows that when topics in a certain division appear in a social media channel, the topic will appear in phone or web chat channels 36 hours later, then if the topic has not been previously seen in data, the system can assume that they will receive calls or inquiries 36 hours after the topic appeared in social media. Numerous actions can be taken to prepare for the potential inquiries.

c. Additional Analytics and Features

A multi-channel topic orchestration server can provide additional analytics based on the topics identified and/or correlated as described in Section I to III. In some embodiments, a multi-channel topic orchestration server can determine a relative importance of topics within a set of topics. As explained in Section I, a multi-channel topic orchestration server can identify one or more topics based on a second set of data provided by the data cleanup and preprocessing operation 204. A multi-channel topic orchestration server can also rank the topics based on the frequency of the words related to the topics within the second set of data. For example, as shown in FIG. 3, a multi-channel topic orchestration server can obtain a set of topics for Social Media_1 data source 302 and can arrange those topics based on their relative importance. Thus, the set of topics 306a indicates that government shutdown topic was discussed more than the economy related topic. A multi-channel topic orchestration server can determine a set of topics for each data source for each time period. Thus, by identifying a set of topics for each time period, a multi-channel topic orchestration server can determine whether a topic gained or lost popularity from one time period to another time period.

In some embodiments, if a multi-channel topic orchestration server determines that a similarity value that describes an extent of similarity between a first and second topic from two data sources is greater than or equal to a pre-determined value, then the multi-channel topic orchestration server may create a routing option on a telephone call routing system, where the routing option is related to the first topic or the second topic, and where the routing option upon selection by a user via a phone call routes the user to a customer service representative to discuss a matter related to the first topic or the second topic.

In some embodiments, if a multi-channel topic orchestration server determines that a similarity value that describes an extent of similarity between a first and second topic from two data sources is greater than or equal to a pre-determined value, then the multi-channel topic orchestration server may perform the following operations: generate a message recommending training for a customer service representative on the first topic or the second topic, or generate a message informing the customer service representative to expect phone calls related to the first topic or the second topic. The multi-channel topic orchestration server can send the generated message to be displayed on one or more computers associated with a customer service representative or a manager. In some implementations, the multi-channel topic orchestration server can change the routing of calls. That is, a new option on an IVR can be added. If the new option is selected by the user, the call can be routed to a representative who is knowledgeable on the subject matter and/or who has received training.

A company or organization can proactively manage its day-to-day operations by providing its customers with information relevant to the topics being discussed on two or more channels. For example, if a multi-channel topic orchestration server determines that a similarity value that describes an extent of similarity between a first and second topic from two data sources is greater than or equal to a pre-determined value, then the multi-channel topic orchestration server may generate and send a message to a user device. The user device displays the message that requests a person to perform an action, such as to call a company or organization or to click on a web-link to obtain information if the person is affected by the first or the second topic. In some implementations, the multi-channel topic orchestration server can include a message on its website relating to the topic, send a push notification, provide an in-application message, send a text message, or take other action.

Figure 4:
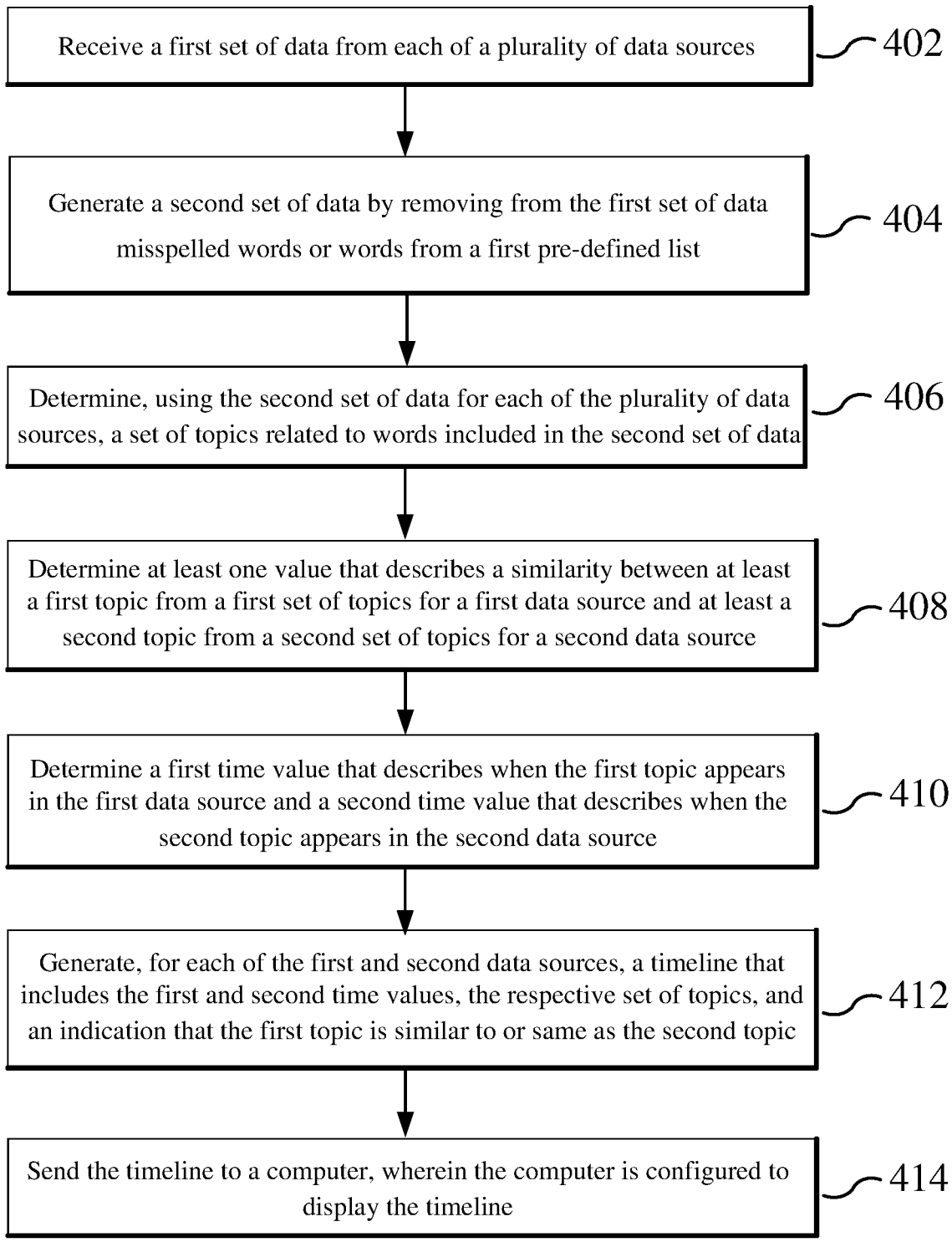
FIG. 4 shows an example flowchart to identify and/or correlate topics.

FIG. 4 shows an example flowchart to identify and/or correlate topics. At the receiving operation 402, a multi-channel topic orchestration server receives a first set of data from each of a plurality of data sources, where the first set of data includes recorded words from people. At the generating operation 404, a multi-channel topic orchestration server generates a second set of data by removing from the first set of data misspelled words or words from a first pre-defined list. The second set of data is generated for each of the plurality of data sources. At the determining operation 406, a multi-channel topic orchestration server determines, using the second set of data for each of the plurality of data sources, a set of topics related to words included in the second set of data, where a total number of topics within the set of topics is based on a pre-determined number for each of the plurality of data sources.

At the determining operation 408, a multi-channel topic orchestration server determines at least one value that describes a similarity between at least a first topic from a first set of topics for a first data source and at least a second topic from a second set of topics for a second data source. At the determining operation 410, a multi-channel topic orchestration server determines a first time value that describes when the first topic appears in the first data source and a second time value that describes when the second topic appears in the second data source.

At the generating operation 412, a multi-channel topic orchestration server generates, for each of the first and second data sources, a timeline that includes the first and second time values, the respective set of topics, and an indication that the first topic is similar to or same as the second topic. The first and second time values fall within a configurable time period for the timeline, and the indication is based on the at least one value being greater than or equal to a pre-determined value. At the sending operation 414, a multi-channel topic orchestration server sends the timeline to a computer, where the computer is configured to display the timeline.

In some embodiments, a multi-channel topic orchestration server is further configured to receive a third set of data from the first data source. The third set of data includes recorded words from people, the third set of data is received after the first set of data is received, and the third set of data is associated with a third time value. A multi-channel topic orchestration server is also configured to generate a fourth set of data by removing from the third set of data misspelled words or words from the first pre-defined list, and in response to determining that the fourth set of data includes the first topic: determine a fourth time value that predicts when the first topic or the second topic appears in the second data source, where the fourth time value is based on the third time value and a difference between the first and second time values.

In some embodiments, a multi-channel topic orchestration server is further configured to create a routing option on a telephone call routing system in response to the at least one value being greater than or equal to the pre-determined value, where the routing option is related to the first topic or the second topic, and where the routing option upon selection by a user via a phone call routes the user to a customer service representative to discuss a matter related to the first topic or the second topic.

In some embodiments, a multi-channel topic orchestration server is further configured to: perform an action in response to the at least one value being greater than or equal to the pre-determined value, where the action includes: (1) generate a message recommending training for a customer service representative on the first topic or the second topic, or (2) generate a message informing the customer service representative to expect phone calls related to the first topic or the second topic. The multi-channel topic orchestration server is also configured to send the message to the computer, where the computer is configured to display the message to a person.

In some embodiments, the plurality of data sources includes a second server that provides recorded telephone conversations, and the determined set of topics for the second set of data for the recorded telephone conversations exclude topics from a second pre-defined list. In some embodiments, a multi-channel topic orchestration server is further configured to generate and send a message to one or more user devices in response to the at least one value being greater than or equal to the pre-determined value, where the one or more user devices displays the message that requests one or more persons to perform an action.

In some embodiments, the set of topics are determined based at least in part on a second set of values that describe a frequency of usage of each word in the second set of data. In some embodiments, the set of topics are determined by performing an unsupervised topic modeling technique. In some embodiments, the plurality of data sources includes a second server that provides content from a social media platform, or a third server that provides web chat content. In some embodiments, the recorded content from people includes text transcripts or audio recordings. In some embodiments, the pre-determined number for each of the plurality of data sources is same.

In some embodiments, the above-described method (e.g., in FIG. 4) is embodied in the form of processor-executable code and stored in a non-transitory machine-readable medium. The non-transitory machine readable medium has machine executable instructions stored thereon that, when executed by one or more processors, direct the one or more processors to perform the above-described method (e.g., in FIG. 4). In some embodiments, a device that is configured or operable to perform the above-described methods is disclosed.

Figure 5:
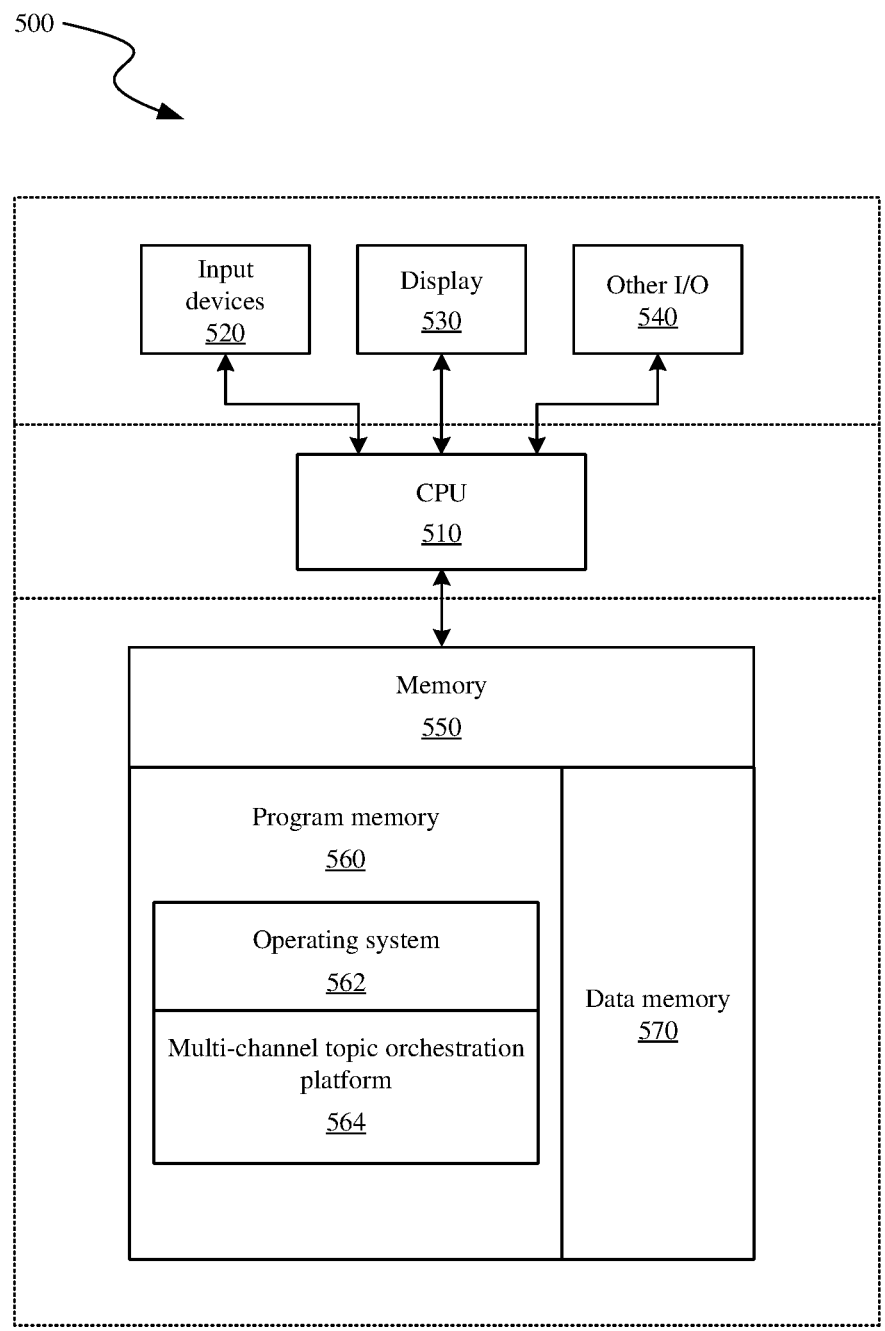
FIG. 5 shows a block diagram illustrating an overview of devices on which some implementations of the disclosed technology can operate.

FIG. 5 shows a block diagram illustrating an overview of devices on which some implementations of the disclosed technology can operate. The devices can comprise hardware components of a device 500, such as a multi-channel topic orchestration server that manages the multi-channel topic orchestration platform 564 to provide a timeline or information related to the topics for the various data sources. The devices can also comprise hardware components of a device 500, such as a computer or user device that can display the message(s) sent by the multi-channel topic orchestration server. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node (e.g., a server) or with a user device (e.g., a laptop, desktop, or mobile device). The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562 and multi-channel topic orchestration platform 564. The multi-channel topic orchestration platform 564 may include processes or methods described in Sections I-III and FIGS. 1-4 of this patent document. Thus, for example, the memory 550 may store instructions that upon execution by CPU 510 configure the device 500 to perform the operations described for the multi-channel topic orchestration server in FIGS. 1 to 4 and/or in the various embodiments described in this patent document. Memory 550 can also include data memory 570 that can include the topics identified and/or correlated for the various data sources, which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:
1. A system, comprising:
one or more processors; and
one or more memories storing instructions that, when executed by the one or more processors, cause the system to perform a process comprising:

receiving a first set of data from a first data source, wherein the first set of data includes recorded words from people;

receiving a second set of data from a second data source, wherein the second set of data includes recorded words from people;

determining, using the first set of data, a set of topics related to words included in the first set of data, wherein a total number of topics within the set of topics is based on a pre-determined number;

determining at least one value that describes a similarity between at least a first topic from the set of topics from the first data source and at least a second topic from the set of topics for the second data source;

determining a first time value that describes when the first topic appears in the first data source and a second time value that describes when the second topic appears in the second data source;

determining, based on the similarity between the first topic and the second topic and a time difference between the first time value and the second time value, a predicted time when the first topic will appear in the second data source;

in response to determining the predicted time when the first topic will appear in the second data source, issuing training for at least one customer service representative to respond to one or more questions related to the first topic prior to the predicted time when the first topic will appear in the second data source;

generating, for the first data source and the second data source, a respective first and second timeline that includes the first and second time values, the first topic and the second topic, and an indication that the first topic is similar to or same as the second topic, wherein the first and second time values fall within a configurable time period for the first timeline and the second timeline, respectively, and wherein the indication is based on the at least one value being greater than or equal to a pre-determined value; and sending, to a computer of the at least one customer service representative, the first timeline for the first data source and the second timeline for the second data source, wherein the computer is configured to display the first timeline and the second timeline, respectively.

2. The system of claim 1, wherein the process further comprises:
receiving a third set of data from the first data source, wherein the third set of data includes recorded words from people,
wherein the third set of data is received after the first set of data is received,
wherein the third set of data is associated with a third time value;
generating a fourth set of data by removing from the third set of data misspelled words or words from the first pre-defined list; and
in response to determining that the fourth set of data includes the first topic:
determining a fourth time value that predicts when the first topic or the second topic appears in the second data source,
wherein the fourth time value is based on the third time value and a difference between the first and second time values.

3. The system of claim 1, wherein the process further comprises:
creating a routing option on a telephone call routing system in response to the at least one value being greater than or equal to the pre-determined value,
wherein the routing option is related to the first topic or the second topic, and
wherein the routing option upon selection by a user via a phone call routes the user to a customer service representative to discuss a matter related to the first topic or the second topic.

4. The system of claim 1, wherein the process further comprises:
performing an action in response to the at least one value being greater than or equal to the pre-determined value, wherein the action includes:
(1) generating a message recommending training for a customer service representative on the first topic or the second topic, or
(2) generating a message informing the customer service representative to expect phone calls related to the first topic or the second topic, and
sending the message to the computer, wherein the computer is configured to display the message to a person.

5. The system of claim 1,
wherein the first data source or the second data source includes a server that provides recorded telephone conversations, and
wherein the determined set of topics for the second set of data for the recorded telephone conversations exclude topics from a second pre-defined list.

6. The system of claim 1,
wherein the process further comprises generating and sending a message to one or more user devices in response to the at least one value being greater than or equal to the pre-determined value, and
wherein the one or more user devices displays the message that requests one or more persons to perform an action.

7. The system of claim 1, wherein the second topic is determined based on a frequency of usage of each word in the second set of data.

8. The system of claim 1, wherein the set of topics are determined by performing an unsupervised topic modeling technique.

9. The system of claim 1, wherein the first data source or the second data source includes a server that provides content from a social media platform, or a second server that provides web chat content.

10. The system of claim 1, wherein the recorded content from people includes text transcripts or audio recordings.

11. The system of claim 1, wherein the pre-determined number for the first data source and the second data source is same.

12. A method, comprising:
receiving a first set of data from a first data source, wherein the first set of data includes recorded words from people;
receiving a second set of data from a second data source, wherein the second set of data includes recorded words from people;
determining, using the first set of data, a set of topics related to words included in the first set of data,
wherein a total number of topics within the set of topics is based on a pre-determined number;
determining at least one value that describes a similarity between at least a first topic from the set of topics from the first data source and at least a second topic from the set of topics for the second data source;

determining a first time value that describes when the first topic appears in the first data source and a second time value that describes when the second topic appears in the second data source;

determining, based on the similarity between the first topic and the second topic and a time difference between the first time value and the second time value, a predicted time when the first topic will appear in the second data source;

in response to determining the predicted time when the first topic will appear in the second data source, issuing training for at least one customer service representative to respond to one or more questions related to the first topic prior to the predicted time when the first topic will appear in the second data source;

generating, for the first data source and the second data source, a respective first and second timeline that includes the first and second time values, the first topic and the second topic, and an indication that the first topic is similar to or same as the second topic,
  wherein the first and second time values fall within a configurable time period for the first timeline and the second timeline, respectively, and
  wherein the indication is based on the at least one value being greater than or equal to a pre-determined value; and sending, to a computer of the at least one customer service representative, the first timeline for the first data source and the second timeline for the second data sourced, wherein the computer is configured to display the first timeline and the second timeline, respectively.

13. The method of claim 12, further comprising:
receiving a third set of data from the first data source,
  wherein the third set of data includes recorded words from people,
  wherein the third set of data is received after the first set of data is received,
  wherein the third set of data is associated with a third time value;
generating a fourth set of data by removing from the third set of data misspelled words or words from the first pre-defined list; and
in response to determining that the fourth set of data includes the first topic:
  determining a fourth time value that predicts when the first topic or the second topic appears in the second data source,
  wherein the fourth time value is based on the third time value and a difference between the first and second time values.

14. The method of claim 12, further comprising:
creating a routing option on a telephone call routing system in response to the at least one value being greater than or equal to the pre-determined value,
  wherein the routing option is related to the first topic or the second topic, and
  wherein the routing option upon selection by a user via a phone call routes the user to a customer service representative to discuss a matter related to the first topic or the second topic.

15. The method of claim 12, further comprising:
performing an action in response to the at least one value being greater than or equal to the pre-determined value, wherein the action includes:
  (1) generating a message recommending training for a customer service representative on the first topic or the second topic, or
  (2) generating a message informing the customer service representative to expect phone calls related to the first topic or the second topic, and
sending the message to the computer, wherein the computer is configured to display the message to a person.

16. The method of claim 12,
  wherein the first data source or the second data source includes a server that provides recorded telephone conversations, and
  wherein the determined set of topics for the second set of data for the recorded telephone conversations exclude topics from a second pre-defined list.

17. The method of claim 12, wherein the second topic is determined based on a frequency of usage of each word in the second set of data.

18. The method of claim 12, wherein the first data source or the second data source includes a server that provides content from a social media platform, or another server that provides web chat content.

19. The method of claim 12, wherein the recorded content from people includes text transcripts or audio recordings.

20. A non-transitory machine-readable medium having machine executable instructions stored thereon that, when executed by one or more processors, direct the one or more processors to perform a method comprising:
receiving a first set of data from a first data source, wherein the first set of data includes recorded words from people;
receiving a second set of data from a second data source, wherein the second set of data includes recorded words from people;
determining, using the first set of data, a set of topics related to words included in the first set of data,
  wherein a total number of topics within the set of topics is based on a pre-determined number;
determining at least one value that describes a similarity between at least a first topic from the set of topics from the first data source and at least a second topic from the set of topics for the second data source;
determining a first time value that describes when the first topic appears in the first data source and a second time value that describes when the second topic appears in the second data source;
determining, based on the similarity between the first topic and the second topic and a time difference between the first time value and the second time value, a predicted time when the first topic will appear in the second data source;
in response to determining the predicted time when the first topic will appear in the second data source, issuing training for at least one customer service representative to respond to one or more questions related to the first topic prior to the predicted time when the first topic will appear in the second data source;
generating, for the first data source and the second data source, a respective first and second timeline that includes the first and second time values, the first topic and the second topic, and an indication that the first topic is similar to or same as the second topic,
  wherein the first and second time values fall within a configurable time period for the first timeline and the second timeline, respectively, and wherein the indication is based on the at least one value being greater than or equal to a pre-determined value; and sending, to a computer of the at least one customer service representative, the first timeline for the first data source and the second timeline for the second data source, wherein the computer is configured to display the first timeline and the second timeline, respectively.

\* \* \* \* \*